United States Patent
Hobbs et al.

(10) Patent No.: US 12,105,539 B2
(45) Date of Patent: Oct. 1, 2024

(54) CONTROL SYSTEM FOR ONE OR MORE ABLUTIONARY DEVICES

(71) Applicant: Kohler Mira Limited, Gloucestershire (GB)

(72) Inventors: Barry Steven Hobbs, Cheltenham (GB); Alexander Colin Fagg, Cheltenham (GB); Charles Maxwell Parker, Cheltenham (GB)

(73) Assignee: KOHLER MIRA LIMITED, Cheltenham (GB)

( * ) Notice: Subject to any disclaimer, the term of this patent is extended or adjusted under 35 U.S.C. 154(b) by 308 days.

(21) Appl. No.: 17/502,780

(22) Filed: Oct. 15, 2021

(65) Prior Publication Data
US 2022/0121230 A1    Apr. 21, 2022

(30) Foreign Application Priority Data
Oct. 19, 2020    (GB) ...................................... 2016540

(51) Int. Cl.
*G05D 23/13* (2006.01)
*E03C 1/02* (2006.01)
*E03C 1/04* (2006.01)

(52) U.S. Cl.
CPC ......... *G05D 23/1393* (2013.01); *E03C 1/023* (2013.01); *E03C 1/041* (2013.01); *G05D 23/1353* (2013.01); *E03C 1/0408* (2013.01)

(58) Field of Classification Search
CPC ............ G05D 23/132; G05D 23/1333; G05D 23/1334; G05D 23/134; G05D 23/1346; G05D 23/1353; G05D 23/1366; G05D 23/1373; G05D 23/1393
See application file for complete search history.

(56) References Cited

U.S. PATENT DOCUMENTS

| | | | |
|---|---|---|---|
| 3,962,733 A | 6/1976 | Parry | |
| 4,635,668 A | 1/1987 | Netter | |
| 5,746,240 A | 5/1998 | Ayotte et al. | |
| 6,722,575 B1 * | 4/2004 | Gagne | G05D 23/1393 236/12.12 |
| 9,719,234 B1 | 8/2017 | Christopher et al. | |
| 2015/0362219 A1 * | 12/2015 | Wehner | F24S 10/50 126/714 |
| 2017/0052550 A1 * | 2/2017 | Akita | G05D 23/1393 |
| 2020/0191281 A1 * | 6/2020 | Fratantonio | F16K 5/0605 |

OTHER PUBLICATIONS

Combined Search and Examination Report on GB 2016540.3 dated Apr. 20, 2021; 6 pages.

* cited by examiner

*Primary Examiner* — Jonathan Bradford
(74) *Attorney, Agent, or Firm* — Husch Blackwell LLP

(57) ABSTRACT

A control system for one or more ablutionary devices includes a valve having one or more valve members, one or more supply inlets, and an output for supplying output water to one or more ablutionary devices downstream of the valve. The control system may include one or more temperature sensors arranged to communicate one or more temperature signals indicative of one or more upstream water supplies to a controller when the ablutionary devices are not in use. The controller may then generate an indicator signal based on a comparison of the one or more temperature signals to one or more thresholds. In response to an indicator signal being generated, the control system may activate the valve to prevent or reduce the likelihood of damage due to severe environmental conditions.

19 Claims, 5 Drawing Sheets

CONTROL SYSTEM FOR ONE OR MORE ABLUTIONARY DEVICES

CROSS-REFERENCE TO RELATED PATENT APPLICATIONS

The present application claims priority to and the benefit of United Kingdom Application No. GB 2016540.3, filed Oct. 19, 2020, the entire disclosure of which, including the specification, drawings, claims and abstract, is incorporated herein by reference.

BACKGROUND

The present application relates to a control system for one or more ablutionary devices such as a shower system, a tap, faucet or the like or any combination of such ablutionary devices. The present application also relates to a method performed by such a control system. More specifically, the present application relates to the control of an electronically controlled ablutionary device such as a digital shower or tap.

Electronically controlled, or digital, showers and taps can include a mixer valve unit that is provided with a cold water and a hot water input from which a blended output stream is produced in response to an electrical control signal. A temperature sensor can be used in the output stream to create a feedback loop in order to control the temperature of the output stream by blending appropriate levels of the input hot and cold water. The feedback loop is used to maintain the output stream at a target temperature.

In a digital shower or tap system the temperature and flow of the output stream can be controlled remotely by the user with a separate user interface. This is usually located remotely from the mixer valve unit so that the mixer valve unit and user interface form a control system. The user interface allows the user to set a desired water output property, such as the desired temperature and/or flow rate, and can provide more complex control functionality such as allowing pre-programmed or custom shower experiences to be provided.

Digital shower/tap systems have a number of advantages in terms of improved functionality and user experience by giving greater and more convenient control of the output water stream. The drawbacks of these systems however may include that the mixer valve unit is often installed in a loft space or similar location in which the ambient temperature is different from that of the location of the shower system being supplied. The different ambient temperature may lead to problems with water being frozen in the mixer valve unit causing damaging expansion. A similar problem can occur if temperatures are excessively high at the mixer valve unit, again causing damaging expansion of water.

A general problem to be addressed therefore is how to alleviate problems caused by an excessively high or low ambient temperature experienced by the mixer valve unit supplying a remotely located ablutionary device.

SUMMARY

An exemplary embodiment relates to a control system for one or more ablutionary devices that includes a valve having one or more valve members each arranged to receive a respective water supply via one or more supply inlets, and an output for suppling output water to the one or more ablutionary devices downstream of the valve, the one or more valve members being arranged to control the flow of water between the one or more supply inlets and the output. The control system also includes one or more temperature sensors arranged to generate a respective temperature signal indicative of the temperature of any one or more of: the water supply upstream of any one or more of the valve members, and the output water down stream of the one or more valve members. The control system also includes a controller in communication with the one or more temperature sensors, the controller configured to: obtain one or more temperature signals from the one or more temperature sensors when the one or more ablutionary devices are not in use; and generate an indicator signal based on a comparison of the one or more temperature signals to one or more thresholds.

Another exemplary embodiment relates to a method performed by a control system for one or more ablutionary devices, the control system including a valve having one or valve members each arranged to receive a respective water supply via one or more supply inlets, and an output for suppling output water to the one or more ablutionary devices downstream of the valve, the one or more valve members being arranged to control the flow of water between the one or more supply inlets and the output. The method includes obtaining one or more temperature signals when the one or more ablutionary devices are not in use, the one or more temperature signals being indicative of the temperature of any one or more of: the water supply upstream of any one or more of the valve members, and the output water down stream of the one or more valve members; and generating an indicator signal based on a comparison of the one or more temperature signals to one or more thresholds.

BRIEF DESCRIPTION OF THE DRAWINGS

Embodiments of the invention will now be described, by way of example only, with reference to the accompanying drawings, in which.

DETAILED DESCRIPTION

Figure 1:
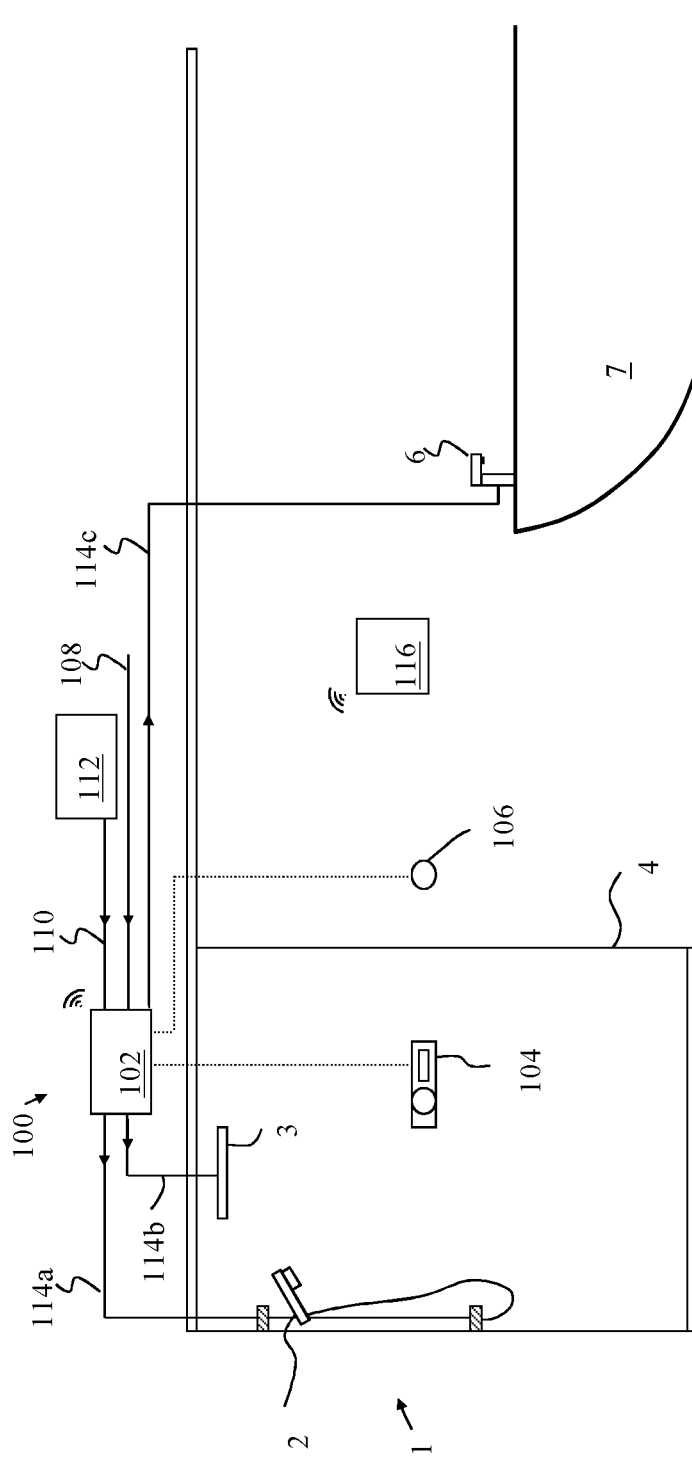
FIG. 1 shows a schematic side view of an ablutionary device having a control system according to an embodiment.

A first aspect provides a control system for one or more ablutionary devices, comprising any one or more of: a valve having one or valve members each arranged to receive a respective water supply via one or more supply inlets, and an output for suppling output water to the one or more ablutionary devices downstream of the valve, the one or more valve members being arranged to control the flow of water between the one or more supply inlets and the output; one or more temperature sensors arranged to generate a respective temperature signal indicative of the temperature of any one or more of: the water supply upstream of any one or more of the valve members, and the output water down stream of the one or more valve members; and a controller in communication with the one or more temperature sensors, the controller configured to: obtain one or more temperature signals from the one or more temperature sensors when the one or more ablutionary devices are not in use; and generate an indicator signal based on a comparison of the one or more temperature signals to one or more thresholds.

The control system is therefore able to determine if the temperature of water detected by the one or more temperature sensors is outside of a predefined range. This can provide an indirect measurement of whether the ambient temperature is outside of a predefined safe range and so could cause damage to the control system. By generating the indicator signal appropriate action can be taken to prevent damage from occurring.

The indicator signal may be generated if the comparison of the one or more temperature signals to the one or more thresholds indicates that the water is at a temperature corresponding to water expansion greater than the tolerance of the control system. This may help to identify risk of water expansion damaging the control system by pressure build up.

The one or more thresholds may include a predefined low temperature expansion warning threshold, and the indicator signal may be generated if the comparison indicates that the water temperature is less than the predefined low temperature expansion warning threshold.

The one or more thresholds may include a predefined high temperature expansion warning threshold, and the indicator signal may be generated if the comparison indicates that the water temperature is greater than the predefined high temperature expansion warning threshold.

The controller may be arranged to allow water flow from the output in response to the generation of the indicator signal. This may be done by opening the valve by the controller, or opening any shut-off valve(s) forming part of the control system that stops water flow.

The one or more thresholds may include a high temperature operation damage warning threshold and the indicator signal may be generated if the comparison indicates that the water temperature is greater than the high temperature operation damage warning threshold. The high temperature operation damage warning threshold may correspond to a maximum safe operating ambient temperature of the control system.

The controller may be arranged to block operation of the one or more ablutionary devices or limit an operating duration of the one or more ablutionary devices in response to the generation of the indicator signal based on the high temperature operation damage warning threshold being exceeded.

The controller may be arranged to obtain the one or more temperature signals intermittently during a period in which the ablutionary device is not in use.

The controller may be arranged to obtain the one or more temperature signals from the one or more temperature sensors after a time period of non-use has elapsed. This may be a period of, for example, at least two hours. This may allow stationary water within the control system to reach ambient temperature.

The one or more thresholds may include a predefined low temperature alert threshold. The indicator signal may be generated if the comparison indicates that the water temperature is less than the predefined low temperature alert threshold at any point during non-operation of the ablutionary device.

The controller may be arranged to send or transmit the indicator signal. The controller may be configured to send the indicator signal to a user interface and/or a remote device for display and/or storage.

The controller may be configured to send the indicator signal via a wireless connection (e.g. Bluetooth or WiFi network) or via a wired connection.

The controller may be arranged to send the indicator signal over a wireless network to a server at location remote from the control system.

The controller may further comprise a memory, and the controller may be arranged to store the indictor signal in the memory.

The control system may comprise a valve unit (e.g. a mixer valve unit) in which the valve is located. The valve unit may be configured to be located remotely from the ablutionary device in a location which experiences a different ambient temperature in use. The one or more temperature sensors may be arranged to measure the temperature of water within the valve unit.

The valve may be a mixer valve, wherein the one or more supply inlets include a first inlet and a second inlet configured to receive a supply of hot and cold water such that one of the first and second inlets carries a supply of hot water and the other of the first and second inlets carries a supply of cold water, the one or more valve members include a first valve member arranged to control the flow of water from the first inlet and a second valve member to control the flow of water from the second inlet, and the output is configured to output cold water, hot water or a mixture thereof as the output stream.

The one or more temperature sensors may comprise any one or more of: a) a first temperature sensor arranged to generate a temperature signal indicative of the temperature of hot or cold water upstream of a respective valve member; b) a second temperature sensor arranged to generate a temperature signal indicative of the temperature the other of the hot or cold water upstream of a respective valve member; and c) an output temperature sensor arranged to generate a temperature signal indicative of the temperature of the output water downstream of the one or more valve members.

The control system may comprise a plurality of outputs, each configured to output water from the one or more inlets, the plurality of outputs being configured to supply multiple water outlets of the same ablutionary device and/or a plurality of ablutionary devices.

The control system may further comprise one or more shut-off valves (e.g. formed by solenoids) each arranged to control the flow in each of the outputs. The one or more shut-off valves may be activated in response to the indicator signal.

A pipework manifold may be provided downstream of the mixer valve at which the output stream is divided amongst the plurality of outputs.

A second aspect provides a system comprising one or more ablutionary devices fluidly coupled to the control system of the first aspect. The control system may be located remotely from the ablutionary devices, for example in a location that experiences a different ambient temperature such as a different room or loft space.

A third aspect provides a method performed by a control system for one or more ablutionary devices, the control system comprising a valve having one or valve members each arranged to receive a respective water supply via one or more supply inlets, and an output for suppling output water to the one or more ablutionary devices downstream of the valve, the one or more valve members being arranged to control the flow of water between the one or more supply inlets and the output, the method comprising: obtaining one or more temperature signals when the one or more ablutionary devices are not in use, the one or more temperature signals being indicative of the temperature of any one or more of: the water supply upstream of any one or more of the valve members, and the output water down stream of the one or more valve members; and generating an indicator signal based on a comparison of the one or more temperature signals to one or more thresholds.

The indicator signal may be generated if the comparison of the one or more temperature signals to the threshold indicates that the water is at a temperature corresponding to water expansion greater than the tolerance of the control system.

The one or more thresholds may include a predefined low temperature expansion warning threshold, and the indicator signal may be generated if the comparison indicates that the water temperature is less than the predefined low temperature expansion warning threshold.

The one or more thresholds may include a predefined high temperature expansion warning threshold, and the indicator signal may be generated if the comparison indicates that the water temperature is greater than the predefined high temperature expansion warning threshold.

The one or more temperature signals are obtained intermittently during a period in which the ablutionary device is not in use.

The method may further comprise allowing water flow from the output in response to the indicator signal.

The one or more thresholds may include a high temperature operation damage warning threshold and the indicator signal is generated if the comparison indicates that the water temperature is greater than the high temperature operation damage warning threshold. The high temperature operation damage warning threshold may correspond to a maximum safe operating ambient temperature of the control system.

The method may further comprise blocking operation of the ablutionary device, or limiting an operating duration of the ablutionary device, in response to the generation of the indicator signal based on the high temperature operation damage warning threshold being exceeded.

The one or more temperature signals may be obtained from the one or more temperature sensors after a time period of non-use has elapsed.

The one or more thresholds may include a predefined low temperature alert threshold. The indicator signal may be generated if the comparison indicates that the water temperature is less than the predefined low temperature alert threshold at any point during non-operation of the ablutionary device.

The method may comprise sending or transmitting the indicator signal. The method may comprise sending the indicator signal to a user interface and/or a remote device for display and/or storage. Sending the indicator signal may be done via a wireless connection (e.g. Bluetooth or WiFi network) or via a wired connection.

The method may comprise sending the indicator signal over a wireless network to a server.

The method may comprise storing the indicator in a memory of the control system.

The valve may be a mixer valve, wherein the one or more supply inlets include a first inlet and a second inlet configured to receive a supply of hot and cold water whereby one of the first and second inlets carry a supply of hot water and the other of the first and second inlets carry a supply of cold water, the one or more valve members include a first valve member arranged to control the flow of water from the first inlet and a second valve member to control the flow of water from the second inlet, and the output is configured to output cold water, hot water or a mixture thereof as the output stream.

The one or more temperature signals may include any one or more of: a) a temperature signal indicative of the temperature of hot or cold water upstream of the respective valve member; b) a temperature signal indicative of the temperature the other of the hot or cold water upstream of the respective valve member; and c) a temperature signal indicative of the temperature of the output water down stream of the one or more valve members.

The control system may comprise a plurality of outputs, each configured to output water from the one or more inlets, the plurality of outputs being configured to supply multiple water outlets of the same ablutionary device and/or a plurality of ablutionary devices.

The control system may further comprise one or more shut-off valves (e.g. formed by solenoids) each arranged to control the flow in each of the outputs. The method may further comprise activating one or more of the shut-off valves in response to the indicator signal.

The skilled person will appreciate that except where mutually exclusive, a feature described in relation to any one of the above aspects may be applied to any other aspect.

FIG. 1 illustrates a first ablutionary device 1 that is in the form of a shower system. The shower system comprises two water outlets: a first water outlet that is a wall mounted shower head 2 and a second water outlet that is an overhead shower head 3. The water outlets are mounted within a shower enclosure 4. FIG. 1 also shows a second ablutionary device in the form of a spout 6 that provides water to a bath tub 7.

Although three water outlets are shown in FIG. 1 (the spout, overhead shower head and wall mounted shower head), other numbers may be provided. For example, the shower system 1 may have only a single water outlet (e.g. a single shower head or spout) or may have three or more water outlets (e.g. additional mid-level shower heads). The present application relates to other types of ablutionary device which may, for example, be a tap (e.g. faucet) provided for a sink, wash basin, or other similar purpose. In yet other embodiments, each ablutionary device may be a mixture of both taps and shower heads. In some embodiments, the bath tub and shower may be combined (e.g. so that the shower is an over-bath shower).

FIG. 1 further shows a control system 100 that provides a controlled supply of water to the various water outlets of the shower system and bath tub. The control system may therefore be termed a control and supply system. In the embodiment shown in FIG. 1, the control system 100 provides a controlled water supply to two separate ablutionary devices. In other embodiments, any other number of ablutionary devices may be supplied and controlled, e.g. only one or three or more. For example, the control system may be connected to only a shower system or only a spout.

The supply of water is blended from a hot and cold water supply to give the desired water temperature. The control system 100 generally comprises a mixer valve unit 102, a user interface 104, and a remote on/off control 106. The mixer valve unit 102 receives a supply of cold water via a cold water conduit 108 coupled to the plumbing system of the building in which the shower system 1 is located. The cold water conduit provides a suitable supply of cold water. In some embodiments, the cold water supply is provided from a mains cold water supply or may instead be provided from a water tank such as a header tank (not shown in the figures). The mixer valve unit 102 also receives a supply of hot water via a hot water conduit 110 coupled to the plumbing system. The hot water conduit provides a supply of water that has been heated by a water heater 112 provided as part of the plumbing system. The water heater 112 may be an instantaneous water heater (such as a combi-boiler) or a storage water heater. Any other suitable water heater may be used. The mixer valve unit 102 supplies three output conduits 114a, 114b, 114c with a blended water stream produced by mixing the cold and hot water supplies as will be described in more detail later. The output conduits 114a, 114b, 114c are fluidly coupled to the water outlets 2, 3, 6 of the ablutionary devices 1, 6. The mixer valve unit 102 may have any suitable number of water outlets so that a variety of different forms of ablutionary device (having various numbers of water outlets as described above) can be supplied. In some embodiments, the mixer valve unit may have more water outputs than necessary for the ablutionary device or devices being supplied. Any such redundant outlets may be capped-off if not required.

The user interface 104 is mounted within the shower enclosure 4, and is arranged to display information to the user and receive user input to control the shower system. The remote on/off control 106 is located outside of the shower enclosure to allow the user to turn the shower on and off before entering the enclosure 4. In other embodiments, a separate remote on/off control 106 may not be provided, and the shower turned on and off from the user interface 104. A separate user interface may be provided on the bath spout 6 (not visible in the Figures) to allow the flow of water from the spout to be controlled.

The control system 100 may further include, or may be adapted to communicate with, a portable user device 116 that may be used to remotely control the shower system. The portable user device 116 may be a dedicated device, or may take the form of a smart phone or the like on which a suitable application can be installed to interface with the control system 100. The portable user device 116 is in wireless communication with the mixer valve unit 102 via any suitable wireless connection such as Bluetooth or via a WiFi network. In the embodiment shown in FIG. 1, the parts of the control system 100 remote from the mixer valve unit 102 have a wired connection to it. In other embodiments, a wired or wireless connection can be used between any separate parts of the control system 100. For example, the user interface 104 and remote on/off control 106 may be wirelessly connected.

The mixer valve unit 102 may be located within a loft or floor space generally above the shower system. In other embodiments, the mixer valve unit 102 may be located in any other suitable location, such as underneath the bath or in a cupboard.

Figure 2:
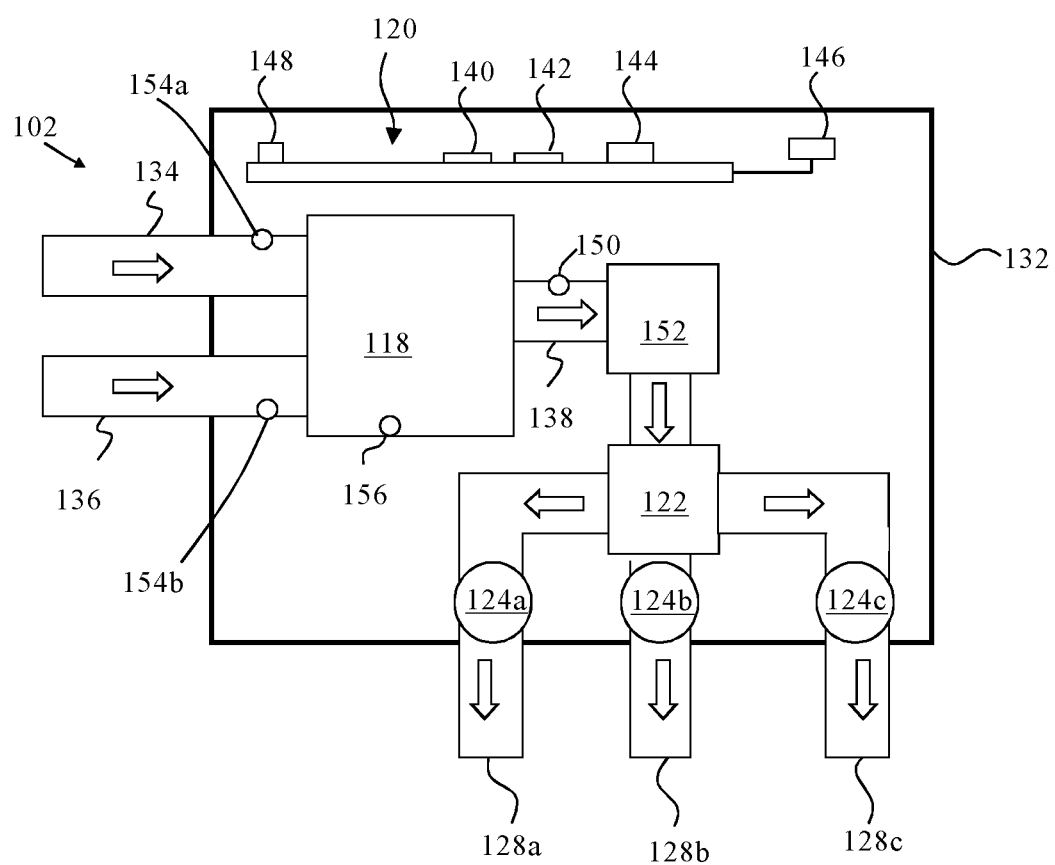
FIG. 2 shows a close-up schematic view of a mixer valve unit forming part of the control system shown in FIG. 1.

Referring now to FIG. 2, the mixer valve unit 102 is shown in more detail. The mixer valve unit 102 generally comprises: a mixer valve 118; a controller 120; a pump 122; first, second and third flow shut-off valves 124a, 124b, 124c; and first, second and third water outlets 128a, 128b, 128c. These components are mounted within a housing 132. Water flow through the mixer valve unit 102 is illustrated by the arrows in FIG. 2. The water carrying conduits, and the path taken by them, shown in FIG. 2 is a schematic example only to illustrate the general flow of water through the mixer valve unit 102. The water carrying conduits may have any suitable size and shape as required to allow for adequate water flow and mounting within the housing 132.

In the presently described embodiment, the mixer valve comprises first and second water inlets 134, 136, each of which is arranged to receive a supply of hot or cold water. Either one the inlets 134, 136 may be coupled to a hot or cold water supply, with the other inlet being coupled to the other of the hot and cold water supplies. In the presently described embodiment, the first water inlet 134 is coupled to the hot water conduit 110 and is referred to as the hot water inlet. The second water inlet 136 is coupled to the cold water conduit 108 and is referred to as the cold water inlet.

The mixer valve further comprises an outlet 138 that is configured to output cold water, hot water or a mixture thereof as an output stream for suppling water to the ablutionary devices 1,6 downstream of the mixer valve 118. The mixer valve 118 comprises one or more valves members that are movable to vary the rate of water flow between the hot and cold inlets and the outlet to control the blended stream. An example of a mixer valve 118 suitable for use in the mixer valve unit 102 will be described in more detail later.

The blended stream produced by the mixer valve 118 flows through the mixer valve outlet 138 (via a flow rate sensor as will be described later) to the pump 122. The pump 122 is also arranged to separate the blended stream into separate output flows. Each of these separate flows is used to supply each of the water outlets provided by the ablutionary device(s) (e.g. the wall mounted and overhead shower heads 2, 3 and bath spout 6). Although three separate output flows are produced by the pump in FIG. 2, any suitable number of outputs may be provided by splitting the blended stream into a suitable number of separate flows. If only one output from the mixer valve unit 102 is required the pump has a single input and output.

The separate output flows from the pump 122 flow through the first, second and third shut-off valves 124a, 124b, 124c respectively. The shut-off valves are each moveable between a closed and open state to provide independent control of water flowing to each water outlet of the ablutionary device(s). This may allow the user to choose which water outlets they wish to use, and independently control the flow rate through each one in a range between the maximum flow provided by the mixer valve 118 and zero flow. The shut-off valves may be solenoid valves. Other types of shut-off valves may however be used. Each output of the mixer valve unit may be provided with a respective shut-off valve. In yet other embodiments, the shut-off valves may not be provided.

The shut-off valves 124a, 124b, 124c are fluidly coupled to respective first, second and third water outlets 128a, 128b, 128c. The first and second outlets 128a, 128b are fluidly coupled to the output conduits 114a, 114b to supply the water outlets of the shower system as shown in FIG. 1, and the third outlet 128c is fluidly coupled to the third output conduit 114c to supply the spout 6.

The pump 122 is arranged to increase the pressure of output flow from the mixer valve 118. The pump 122 may be provided where the control system 100 is to be supplied with a low pressure hot and/cold water supply (e.g. water from a cold/hot water storage tank, rather than a mains supply). The pump 122 is located downstream of a flow rate sensor (as discussed below) and before the shut off valves 124a, 124b, 124c. In other embodiments, a pump may be provided at any suitable point within the control and supply system to increase pressure if required. In yet other embodiments, the pump is absent. Such an embodiment is suitable for use where the supply pressure is adequate without it (e.g. where mains water pressure is provided, rather than water from a hot or cold water storage tank). Where the pump is not provided it may be replaced by a pipework manifold connecting the single output stream from the mixing valve to each of the outlets 128a, 128b, 128c via the shut-off valves.

The controller 120 is arranged to control operation of the various components of the control system 100. The controller 120 is in operative communication with the mixer valve 118, shut-off valves 124a, 124b, 124c, user interface 104, remote on/off control 106 and portable user device 116 by suitable wired or wireless connections. The controller 120 comprises one or more processors 140 and a memory 142 arranged to store computer readable instructions that may be carried out by the processor 140 in order to perform any of functions of the controller described herein. The controller further comprises a wireless communication module in the form of a Bluetooth module 144 and a WiFi module 146 arranged to allow wireless communication between the controller 120 and remotely located parts of the control system. The wireless communication module is further arranged to provide communication over the internet via a wireless local area network (Wi-Fi network), cellular network or any other suitable wireless network. The WiFi module may be a separate module connected to a main PCBA of the controller 120 by a wired connection as shown in FIG. 2. The WiFi module is mounted within the housing 132 in the described embodiment, but may be located remotely from the housing 132 in other embodiments. In yet other embodiments, the WiFi module 146 is located on the main PCBA of the controller.

The controller 120 further comprises a wired connection point 148 to which wired connections to other components of the mixer valve unit or control system 100 may be made. In the presently described embodiment only a single wired connection point 148 is shown. There may however be any suitable number (e.g. three) so that there are one or more wired connection points.

In the embodiment illustrated in FIG. 2, the processor 140 and memory 142 form a microcontroller (MCU) configured to carry out any of the functions of the controller described herein. In other embodiments, the controller may take different forms. The controller may comprise any combination of hardware and software that operates to control and process information and carry out programmed instructions. The controller may comprise any suitable processing circuitry including microprocessors, programmable logic devices, application specific integrated circuits (ASIC), application specific instruction set processors (ASIP) or the like. The controller 120 may be any device suitable for controlling the operations of the control system according to the functions defined herein (or additional functions) by processing information (e.g. information received from sensors, stored in local memory or received from an external source) and outputting instructions to components of the control system (e.g. the mixer valve and shut-off valves accordingly). In some embodiments, the controller 120 may be formed from distributed components, some or all of which may be located outside of the mixer valve unit 102. For example, the controller 120 may be located remotely from the housing 132, and may have a suitable wired or wireless connection with the components within the housing. In the described embodiment a single controller is provided to control a single mixer valve unit 102 in which a single mixer valve is included to provide blended water to water outlets of any number of ablutionary devices. In other embodiments, the controller may be arranged to control multiple mixer valve units 102, for example each having a separate mixer valve 118 and receiving separate hot and cold water supplies. For example, the controller 120 shown in FIG. 2 may control another mixer valve unit that is similar to that shown in FIG. 2, but without needing a second controller.

The control system further comprises one or more sensors that are arranged provide measurements of various operating parameters to the controller 120. Although not shown in FIG. 2, the sensors are operably coupled, either wired or wirelessly, to the controller 120 to send signals thereto.

The control system comprises output stream sensors arranged to generate output stream signals indicative of various water properties of the blended output stream of the mixer valve 118. In the embodiment illustrated in FIG. 2, the output stream sensors include an output temperature sensor 150 and output flow rate sensor 152. In other embodiments an output pressure sensor (not shown in the figures) may also be provided. These sensors are positioned to measure the properties of the water flow at any position downstream of the mixer valve 118 (e.g. downstream of the point where the blended stream is produced within the mixer valve, which may include within the mixer valve itself e.g. downstream of the valve member(s) controlling flow through the valve). They may be located within the mixer valve unit 102 as shown in FIG. 2. They may, for example, be between the mixer valve 118 and the pump 122 or manifold pipe work at which the output stream is divided. They may however be at any suitable position within the mixer valve unit. In other embodiments, they may be provided further downstream from the mixer valve unit.

The control system further comprises a first temperature sensor 154a arranged to generate a temperature signal indicative of the temperature of water flowing through or being supplied to the first water inlet 134 of the mixer valve. The first temperature sensor 154a may be located adjacent to the respective water inlet aperture of the mixer valve, or may be located further downstream at any point before the water flows are mixed within the mixer valve (it may therefore be within the mixer valve itself). The first temperature sensor may be located within the mixer valve unit 102 as shown in FIG. 2. The first temperature sensor may alternatively be located further upstream, and may be upstream of the mixer valve unit 102. The first temperature sensor is arranged to measure the temperature of standing water upstream of the valve member of the mixer valve (i.e. the valve member controlling the flow of water received from the first inlet) when the valve is closed and no water is flowing. This may therefore include the temperature of water within the first water inlet 134, within the mixer valve itself upstream of the valve member, or within the supply conduit 110.

The control system further comprises a second temperature sensor 154b arranged to generate a temperature signal indicative of the temperature of water flowing through or being supplied to the second water inlet 136 of the mixer valve 118. The second temperature sensor 154b may be located adjacent to the respective water inlet aperture of the mixer valve, or may be located further downstream at any point before the water flows are mixed within the mixer valve (it may therefore be within the mixer valve itself). The second temperature sensor 145b may be located within the mixer valve unit 102 as shown in FIG. 2. The second temperature sensor is arranged to measure the temperature of standing water upstream of the respective valve member of the mixer valve (i.e. the valve member controlling the flow of water received from the second inlet) when the valve is closed and no water is flowing. This may therefore include the temperature of water within the second water inlet 136, within the mixer valve itself upstream of the valve member, or within the supply conduit 108.

In the described embodiment, both a first and second temperature sensor are provided to measure temperature signals indicative of the temperature of the hot water supply or the cold water supply to the mixer valve 118. The first or second temperature sensors may measure either a hot water supply temperature signal or cold water supply temperatures signal, depending on which of the first and second inlet 134, 136 is being used to carry hot and cold water. In the described embodiment, the first temperature sensor 154a is a hot inlet temperature sensor measuring a hot temperature signal, and the second temperature sensor 154b is a cold inlet temperature sensor measuring a cold temperature signal. The user may select which inlet is which via a suitable user input once the system is connected.

In other embodiments, only one of the temperature sensors may be provided. In such an embodiment, the first and second inlets 134, 136 are configured to receive only one of a hot or cold water supply (e.g. they are not interchangeable).

In the described embodiment, the mixer valve comprises a valve position sensor 156 arranged to measure an actual valve position signal indicative of the actual position of the valve member or members within the mixer valve 118. The position of the valve members may be measured relative to the valve seat with which they are associated to provide feedback as to how much hot or cold water is being allowed to flow through the mixer valve 118. The valve position sensor 156 may be an encoder (e.g. a rotatory encoder) which may be any suitable type of inductive, magnetic, Hall Effect or resistive sensor. In other embodiments, a target position of the valve members may be relied on rather than a measured actual valve member position. In such an embodiment the valve position sensor 156 is not required and so is absent.

Any of the temperature sensors described herein may comprise a thermistor. Other types of temperature sensor may however be used such as a thermocouple, semiconductor sensor, infrared sensor or any other suitable sensor.

Any of the flow rate sensors described herein may comprise a flow turbine, ultrasonic sensor, pressure differential sensor or any other suitable type of flow rate sensor.

The position of the sensors shown in FIG. 2 is for illustration purposes only. The sensors may be located at any suitable position in order to provide the measurement of the desired properties of water flowing through the control system, or of the control system itself. Any of the sensors described herein are configured to produce a signal that is received by the controller and processed in order to carry out any of the functions described herein. The signals received by the processor may be converted to other formats for processing or storage by the processor.

The number and type of sensors provided in the control system is chosen according to the required functionality of the controller. In some embodiments, any one or more of the sensors shown in FIG. 2 may be absent if they are not required for certain functionality, e.g. if they are not required for the generation of a diagnostic or indicator signal according to any functions of the controller described herein.

The controller is configured to control the mixer valve 118 according to one or more target output water properties. By water properties we mean properties of water including its temperature, flow rate or pressure. The target output water properties are set by the user via the user interface 104 or via the portable remove device 116 using a suitable application running on that device, or may be defined by a shower program stored in the memory 142 of the controller. The controller is arranged to control the mixer valve in response to measurements from the output stream sensors so as to vary the flow of water through the mixer valve (e.g. through each flow control device with the mixer valve) to reach or maintain the desired target output water properties.

Figure 3:
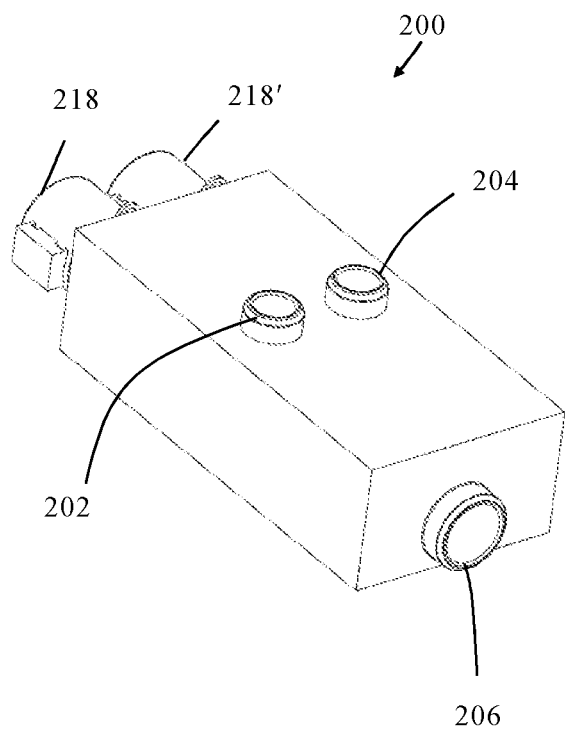
FIGS. 3 and 4 show a perspective and a side view of a mixer valve forming part of the mixer valve unit of FIG. 2.
Figure 4:
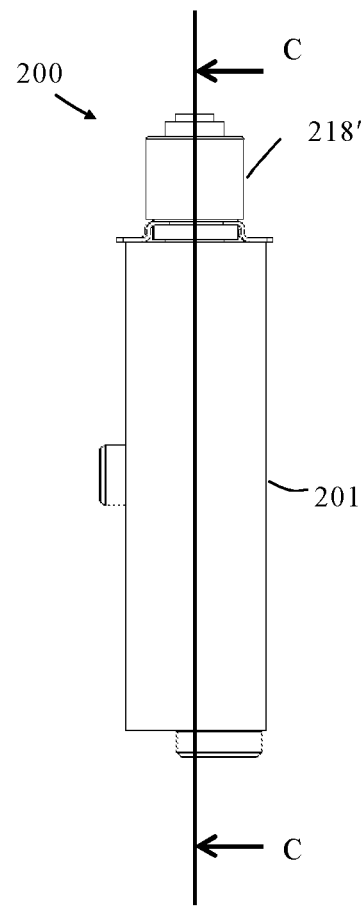
Figure 5:
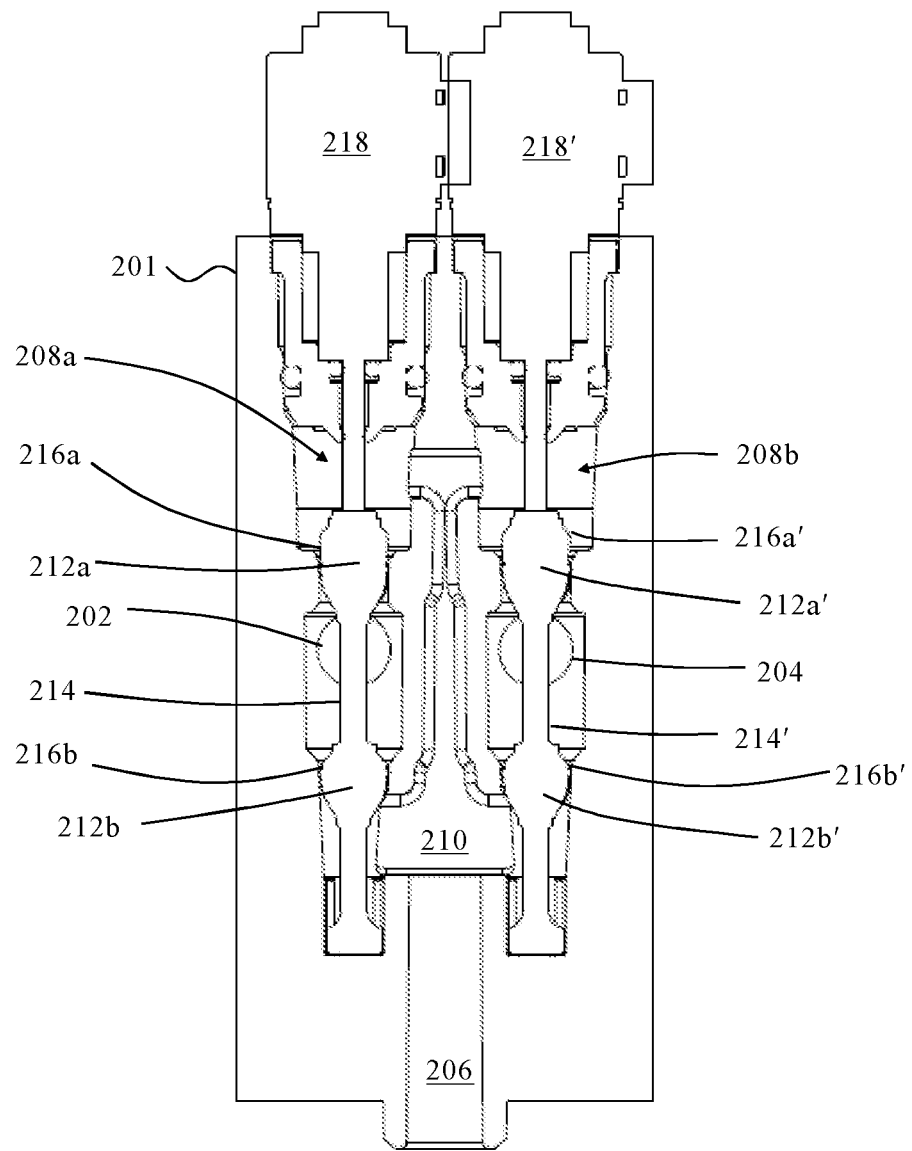
FIG. 5 shows a cross section through line CC marked in FIG. 4.

Referring now to FIGS. 3 to 5, an example of a mixer valve 200 suitable for use in the mixer valve unit 102 is shown in more detail. This is to be understood as only one example with alternative mixing valves that provide the desired controlled blending of hot and cold flows being apparent to the skilled person. The mixer valve 200 comprises a housing 201 having an aperture 202 forming a first water inlet and an aperture 204 forming a second water inlet. The housing 201 further comprises an aperture 206 to form an outlet.

The housing 201 houses a first flow control valve 208a and a second flow control valve 208b. The first flow control valve 206 is arranged to control the flow of water from the first inlet 202 to a mixing chamber 210. The second flow control valve 208 is arranged to control the flow of water from the second inlet 204 to the mixing chamber 210. From the mixing chamber 210 water flows to the outlet 206. The first and second flow control valves may control the flow of hot or cold water, depending on which if the first and second water inlets 134, 136 is connected to the hot or cold water supply.

As can be seen illustrated in FIG. 5, the first flow control valve 208a comprises a first valve member 212a and a second valve member 212b each mounted to a shaft 214. The valve members are arranged to seal against associated valve seats 216a, 216b. The shaft 214 is movable via an actuator 218. The second flow control valve 208b correspondingly comprises a first valve member 212a' and second valve member 212b' with associated valve seats 216a', 216b'. The valves members of the second flow control valve are mounted to a shaft 214' moved by an actuator 218'. The valve member controlling the flow of hot water is referred to herein as a hot valve member, and the valve member controlling the flow of cold water is referred to as a cold valve member. In some embodiments, only one valve member is provided for each of the first and second flow control valves. These may be referred to as first and second valve members elsewhere herein.

The actuators 218, 218' are adapted to control the linear position of the shafts 214, 214' and thus the position of the first and second valve members with respect to the valve seats. The actuators 218, 218' may each comprise a stepper motor coupled with a lead screw arranged to move the associated shaft 214, 214' linearly in an axial direction. Any suitable actuator for controlling linear motion of the shaft may be employed in place of the stepper motor including, but not limited to, linear actuators. The controller 120 is in communication with the actuators 118, 118' (e.g. via a wired connection) so that the flow of water through the valve can be controlled as described above. The controller may also be in communication with the valve member position sensor where provided.

The mixer valve shown in FIGS. 3, 4 and 5 is only one such example. It may, for example, be a mixer valve as described in International Patent Application No. PCT/IB2013/001646 (WO2013/190381) or PCT/GB2018/053122 (WO2019/092401), which are hereby incorporated by reference. In other embodiments, the mixer valve may comprise any suitable number of cooperating valve members and valve seats in order to control the flow of hot and cold water into a mixing chamber.

In any of the embodiments described herein the sensors provided in the mixer valve unit may instead be located remotely from the mixer valve unit whilst still being in communication with the controller 120. For example, the first and second temperature sensors could be provided further upstream, for example in the water supply conduits 108, 110 rather than being part of the mixer valve unit itself. Similarly the outlet temperature sensor could be located downstream of the mixer valve unit.

In some embodiments, the a user interface 104, and a remote on/off control 106 shown in FIG. 1 may not be provided as part of the control system 100 described or claimed herein. In such embodiments, user interaction may be provided only with the mobile device 116 or other form of wired or wireless interface. The control system described or claimed herein may therefore be the mixer valve unit 102 (including any internal or connected remotely located sensors).

Indicator Signal Generation:

The controller 120 is configured to generate an indicator signal in order to indicate if the temperature of stationary water within the control system, when the ablutionary device(s) being supplied are not in use, is outside of a predefined safe range. The controller 120 is arranged to obtain a temperature signal from any one or more of the first temperature sensor 154a, the second temperature sensor 154b or the output temperature sensor 150 when the mixer valve 118 and/or the shutoff valves 124a,b,c are closed and no water is flowing through the control system. The controller 120 is then arranged to compare the obtained temperature signal(s) to one or more thresholds that defined a safe range and generate an indicator signal if the temperature signal(s) are outside of the range. This allows the temperature sensors described above that are used for controlling the output water temperature or providing other diagnostics during use of the shower to also function to detect ambient temperature problems when the ablutionary devices being supplied are not in use.

An indicator signal is generated by the controller based on a comparison between the temperature signals obtained from the relevant temperature sensors, and various predefined threshold temperatures available to the controller 120 as described below. The thresholds may be stored locally in the memory of the controller 120, or accessed by the controller from a remote storage.

The indicator signal is generated by the controller 120 if the comparison of the temperature signal(s) to the threshold(s) indicates that the water is at a temperature at which water expansion greater than the tolerance of the control system occurs. The skilled person will understand that variation in ambient temperature will be reflected in the temperature of stationary water within the control system. As the density of water changes as a function of the temperature, and the stationary water has a restricted volume in which it can expand, damaging pressure may be generated at certain temperatures that cannot be withstood by the control system without damage (e.g. cracks and water leaks).

The controller 120 is arranged to generate the indicator signal if the temperature signal(s) indicates that the water temperature is less than a predefined low temperature expansion warning threshold (which may be referred to as a first low temperature threshold). This predefined threshold may be the temperature of water at which the density begins to increase with decreasing temperature. In one embodiment, the predefined low temperature expansion warning threshold may be 4° C. In other embodiments, the threshold may be the freezing point of the water within the system. Other suitable temperatures may be chosen at which water expansion is sufficient to cause damaging pressure increased.

The controller is further arranged to generate an indicator signal if the temperature signal(s) indicate that the water temperature is greater than a predefined high temperature expansion warning threshold (which may be referred to as a first high temperature threshold). This predefined threshold may be a temperature of water within the system above which damaging water expansion may occur. The predefined high temperature expansion warning threshold may be a temperature of about 60° C. The controller is arranged to compare the temperature signal(s) to the predefined high temperature expansion warning threshold to determine if the stationary water within the system is likely to expand due to excessive ambient temperature of the stationary supply water.

The controller 120 is further arranged to generate an indicator signal if the temperature signal(s) indicate that the water temperature is greater than a predefined high temperature operation damage warning threshold (e.g. a second high temperature threshold). The high temperature operation damage warning threshold corresponds to an ambient temperature at which the control system 100 would be running outside of the recommended specification safe operating conditions, but not so high as to cause dangerous water expansion. The high temperature operation damage warning threshold is therefore less than the high temperature expansion warning threshold. If the damage warning threshold conditions are exceeded there may be a risk of damage being caused to electronic components within the control system if it is operated. The high temperature damage warning threshold may be a temperature of about 50° C. Other suitable temperature may be used in other implementations.

For the high/low temperature expansion thresholds, and high temperature operation damage warning threshold the controller 120 is arranged to obtain the temperature signals from the temperature sensor(s) only after a time period of non-use has elapsed. By allowing the non-use time period to elapse before obtaining the relevant temperature signals the water within the control system being measured by the temperature sensors will have lost or gained sufficient heat such that the temperature is similar or equal to the ambient air temperature. This helps to provide an indirect determination of the ambient temperature, and avoid false readings. The controller 120 may be arranged to determine an end of use time at which the mixer valve 118 or the shut-off valves 124a, b, c are closed. The controller 120 is then arranged to obtain the temperature signals and generate the indicator signal only once the non-use time period has elapsed from the end of use time. The non-use time period may be set to any suitable time period that would allow the stationary water within the system to reach approximate ambient temperature, and may be, for example, a time period of at least two hours. Other suitable time periods may be used depending on the specific implementation.

The controller 120 is further arranged to generate an indicator signal if the temperature signal(s) indicate the water temperature is less than a predefined low temperature alert threshold. The low temperature alert threshold may be an absolute low temperature value below which an alert is generated at any time, not just only after the non-use time period has elapsed. The indicator signal is therefore generated if the comparison indicates that the water temperature is less than the predefined low temperature alert threshold at any point during non-operation of the ablutionary device. The low temperature alert threshold may be 0° C. Other suitable temperatures may however be used in other embodiments.

While in the presently described embodiment the high/low temperature expansion warning thresholds, high temperature operation damage warning threshold and low temperature alert threshold thresholds are all used by the controller 120, in other embodiments the comparison of the temperature signal(s) may be done using any combination of any one or more of these thresholds.

By generating the indicator signal the controller is able to provide an early warning than damaging expansion of water within the system, or component damage during use, may occur. Appropriate action can then be taken to avoid damage being caused to the mixing valve or any other component holding a stationary volume of water or the components (e.g. electronics) of the control system 100 if the system is activated. This is particularly advantageous in the described embodiment where the mixer valve unit 102 is located in a location that is remote from the ablutionary device e.g. in which there is a different ambient temperature. This may include the mixer valve unit being located in a loft space or similar location where an excessively low or high ambient temperature may be experienced. In such a location the mixer valve unit will not be at the same ambient temperature as the location of the ablutionary device(s) that it supplies, and so is more at risk of damaging expansion from freezing of heat stationary water when the ablutionary device is not in use.

The controller 120 is arranged to perform an action in response to the generation of the indicator signal. The action taken may depend on which of the temperature thresholds defined herein the indicator signal has been generated based on.

In one embodiment, in response to the indicator signal, the controller is arranged to activate the mixer valve 118 and/or the shut-off valves 124a, 124b, 124c to allow water to flow and alleviate any pressure build up or reduce the risk of water freezing. This may be done in response to generation of the indicator signal indicating that the water temperature is above the high temperature expansion warning threshold or below the low temperature expansion warning threshold to avoid damaged caused by excess water pressure build up. The controller may be arranged to cause one or more short duration activations of the water flow during periods when the temperature is outside of the predefined range. The mixer valve may be activated in one or more short bursts to alleviate any pressure build up, while reducing the amount of water wasted.

In response to the indicator signal being generated based on the high temperature operation damage warning threshold, the controller 120 is arranged to block operation of the ablutionary device, or limit an operating duration of the ablutionary device, so as to avoid damage being caused by operating at excess ambient temperature. The controller 120 may be arranged to block opening of the mixer valve 118 and/or the shutoff valves 124a,b,c to prevent operation of the ablutionary devices it supplies. The operation of the ablutionary devices may be blocked or disabled until the high temperature operation damage warning threshold is no longer exceeded.

The controller is arranged to obtain the temperature signal(s) from the first and second temperature sensors intermittently during a period in which the ablutionary device is not in use (and after the minimum non-use period has elapsed as described above for the high/low temperature expansion thresholds, and high temperature operation damage warning threshold). The controller may, for example, be arranged to obtain the temperature signal(s) every minute or few minutes. This may reduce power consumption, and still avoid damage from excessive ambient temperatures. In other embodiments, the controller may monitor the temperature signals from the first and second temperature sensors continuously.

The controller 120 is further configured to send the indicator signal to the user interface 104 and/or the remote device 116 for display to the user and/or storage. An indication of the response carried out by the controller based on the indicator signal may also be sent and displayed to the user (e.g. that the water flow has been activated to alleviate pressure or avoid freezing). This may inform the user that there is a risk of damage being caused to the system because of the ambient temperature being outside of the desired range. The controller 120 is configured to send the indicator signal via the wireless communication module (e.g. via Bluetooth or WiFi network) or via a wired connection.

The controller 120 may be further arranged to send the indicator signal (and/or controller response information) to a remote location such as a servicing centre via the internet. The indicator signal may be sent to a remote server system for suitable processing. This may allow the performance of the shower system to be monitored remotely by its manufacturer or a servicing company. This allows a third party such as the manufacturer/servicing company to determine that a fault experienced could have been caused by water expansion damage or operation at a too high ambient temperature. This may help to diagnose problems with the shower operation in advance of it being serviced by the manufacturer or service company to make problems easier to identify and address.

The indicator signal may also be stored in the memory 142 of the controller so that it can be accessed at a later date or form part of a performance log. This can be displayed to the user or communicated to the manufacturer/service company.

Which of the responses above is performed by the controller 120 may depend on the threshold temperature that has been exceeded. In response to the indicator signal generated based on the high/low temperature expansion warning threshold, the controller 120 is arranged to either activate the flow of water to relieve pressure, send the indicator signal to alert the user/third party, or log it in memory (or any combination of these actions).

In response to the indicator signal generated based on the high temperature operation damage warning threshold, the controller 120 is arranged to block operation of the ablutionary device, limit an operating duration of the ablutionary device, send the indicator signal to alert the user/third party, or log it in memory (or any combination of these actions).

In response to the indicator signal generated in based on the low temperature alert threshold, the controller 120 is arranged to either activate the flow of water to reduce the risk of water freezing, send the indicator signal to alert the user/third party, or log it in memory (or any combination of these actions).

Figure 6:
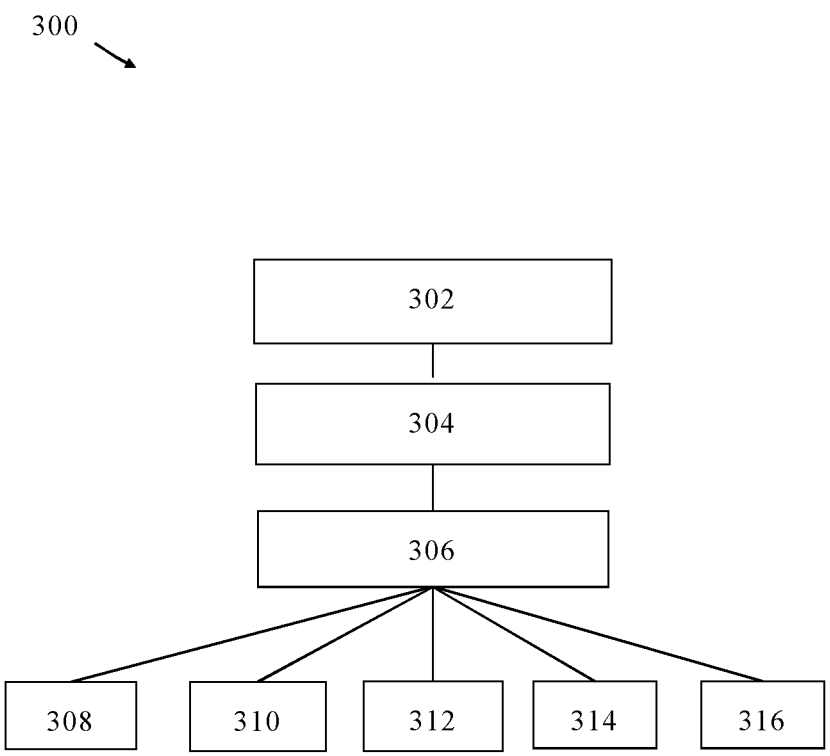
FIG. 6 shows a method performed by a control system according to an embodiment.

Referring to FIG. 6, a method performed by the control system of an ablutionary device or devices is illustrated. The control system and ablutionary devices may be as defined in connection with any other embodiment described herein. As described above, the control system comprises a mixer valve having a first water inlet configured to receive a supply of one of hot or cold water, a second water inlet configured to receive a supply of the other of hot or cold water, and an outlet configured to output cold water, hot water or a mixture thereof as an output stream for suppling water to the ablutionary device downstream of the mixer valve. The method 300 may comprise steps to perform any of the functions of the control system 100 (e.g. functions of the controller 120) as defined elsewhere herein.

The method 300 comprises obtaining 302 one or more temperature signals when the ablutionary device is not in use. The one or more temperature sensors are indicative of the temperature of the water supply upstream of each of the one or more valve members controlling flow through the valve, or the output water down stream of the one or more valve members as described above. The temperature signal(s) are therefore obtained from the any of the first or second temperature sensors 134, 136, or the output temperature sensor 150.

Once the temperature signal(s) are obtained, the method comprises comparing 304 the one or more temperature signals to one or more thresholds as described above. Based on the comparison, an indicator signal is generated 306.

The comparison step 304 comprises comparing the one or more temperature signals to any one or more of the low temperature expansion warning threshold, the high temperature expansion warning threshold, the high temperature operation damage warning threshold or the low temperature alert threshold defined elsewhere herein.

The one or more temperature signals are obtained intermittently during a period in which the ablutionary device is not in use in order to reduce power consumption. In other embodiments, a continuous monitoring may be performed. The one or more temperature signals are obtained from the one or more temperature sensors in step 302 after a time period of non-use has elapsed for comparison to the high/low temperature expansion warning threshold or the high temperature operation damage warning threshold as described above. For comparison to the low temperature alert threshold, the one or more temperature signals are obtained in step 302 at any point during non-operation of the ablutionary device, rather than first waiting for the non-use period to elapse.

Once the indicator signal has been generated, the method comprises taking various forms of action in response.

The method 300 comprises allowing 308 water flow from the output in response to the indicator signal. This may be done by opening the valve 118 and/or the shut-off valves 124a, 124b, 124c to allow water to flow. This allows any pressure build caused by water expansion to be alleviated. The water flow may be activated intermittently during a period in which the temperature signal(s) are found to be outside of the safe range defined by the minimum and/or maximum thresholds. The valve may, for example, be activated in a short burst or bursts to avoid wasting water.

The method 300 further comprises sending 310 the indicator signal to a user interface and/or a remote device for display and/or storage. The indicator signal may be sent via a wireless connection (e.g. Bluetooth or WiFi network) or via a wired connection as described elsewhere herein. The indicator signal may be sent to one or more of the user interface 104 and the portable device 116. Sending 310 the indicator signal may alternatively or additionally comprise sending it to a server of a remote third party as discussed above to be acted upon.

The method also comprises storing 312 the indicator in a memory of the control system.

The method 300 also comprises blocking 314 operation of the ablutionary devices, and/or limiting 316 an operating duration of the ablutionary devices. One or both of these actions may be taken in response to the generation of the indicator signal based on the high temperature operation damage warning threshold as discussed above.

While FIG. 6 shows various actions 308, 310, 312, 314, 316 that may be taken in response to the generation of the indicator signal, in some embodiments, any one or more of these may be provided and may be combined in any combination (for example, the valve may be activated and the indicator signal sent for display to the user, or only one of these actions may be performed).

The action taken may depend on which threshold comparison has been used to trigger the indicator signal generation.

As discussed above, in response to the indicator signal being generated based on the high/low temperature expansion warning threshold, the flow of water to relieve pressure is activated 308, the indicator signal to alert the user/third party is sent 310, or stored 312 in memory (or any combination of these actions).

In response to the indicator signal being generated based on the high temperature operation damage warning threshold, the operation of the ablutionary device(s) may be blocked 314 or an operating duration of the ablutionary device(s) may be limited 316 to a safe amount of time, the indicator signal to alert the user/third party is sent 310, or stored 312 in memory (or any combination of these actions).

In response to the indicator signal generated based on the low temperature alert threshold, the flow of water to reduce the risk of water freezing is activated 308, the indicator signal to alert the user/third party is sent 310, or stored 312 in memory (or any combination of these actions).

While the present invention has been described in use with a mixer valve the skilled person will understand that it its use is not so limited. In some embodiments, the mixer valve may be replaced with a valve arranged to control the flow of a single supply of water. In such an embodiment, only a single water supply inlet is present, with a valve having a single flow control valve in place of the mixer valve used to control the flow (e.g. only flow control valve 208a or 208b may be used). An output stream having the same water temperature as the inlet water supply is thus provided, rather than the blended stream. The present application therefore relates more generally to a valve comprising one or valve members each arranged to receive a respective water supply via one or more supply inlets, and an output for suppling output water to the ablutionary device downstream of the valve, the one or more valve members being arranged to control the flow of water between the one or more supply inlets and the output. The temperature sensors on which the threshold comparison is performed are generally arranged to sense the temperature upstream and downstream of the valve (e.g. of the valve members within it) in any one or more of the supply inlets, and/or the output.

Various modifications will be apparent to the skilled person without departing form the scope of the claims. The embodiments described above should be understood as exemplary only. Any feature of any of the aspects or embodiments of the disclosure may be employed separately or in combination with any other feature of the same or different aspect or embodiment of the disclosure and the disclosure includes any feature or combination of features disclosed herein.

What is claimed is:

1. A control system for one or more ablutionary devices, comprising:
   a valve having one or more valve members each arranged to receive a respective water supply via one or more supply inlets, and an output for supplying output water to the one or more ablutionary devices downstream of the valve, the one or more valve members being arranged to control the flow of water between the one or more supply inlets and the output;

one or more temperature sensors arranged to generate a respective temperature signal indicative of the temperature of any one or more of: the water supply upstream of any one or more of the valve members, and the output water down stream of the one or more valve members; and a controller in communication with the one or more temperature sensors, the controller configured to:

obtain one or more temperature signals from the one or more temperature sensors when the one or more ablutionary devices are not in use; and generate an indicator signal based on a comparison of the one or more temperature signals to one or more thresholds, the one or more thresholds including at least a low temperature expansion warning threshold and a high temperature expansion warning threshold, wherein the controller is configured to alleviate pressure build up by activating the valve and allowing water to flow from the output in response to each of:

an indicator signal based on a temperature signal from the water supply upstream of at least one valve member being below the low temperature expansion warning threshold; and an indicator signal based on a temperature signal from the water supply upstream of at least one valve member being above the high temperature expansion warning threshold.

2. The control system of claim 1, wherein the indicator signal is generated if the comparison of the one or more temperature signals to the one or more thresholds indicates that the water is at a temperature corresponding to water expansion greater than a tolerance of the control system.

3. The control system of claim 1, wherein the one or more thresholds include a high temperature operation damage warning threshold and the indicator signal is generated if the comparison indicates that the water temperature is greater than the high temperature operation damage warning threshold, the high temperature operation damage warning threshold corresponding to a maximum safe operating ambient temperature of the control system.

4. The control system of claim 3, wherein the controller is arranged to block operation of the one or more ablutionary devices or limit an operating duration of the one or more ablutionary devices in response to the generation of the indicator signal based on the high temperature operation damage warning threshold.

5. The control system of claim 1, wherein the controller is arranged to obtain the one or more temperature signals from the one or more temperature sensors after a time period of non-use has elapsed.

6. The control system of claim 1, wherein the one or more thresholds include a predefined low temperature alert threshold, wherein the indicator signal is generated if the comparison indicates that the water temperature is less than the predefined low temperature alert threshold at any point during non-operation of the ablutionary device.

7. The control system of claim 1, wherein the controller is further configured to send the indicator signal to a user interface and/or a remote device for display and/or storage, and wherein the controller is configured to send the indicator signal via a wireless connection or via a wired connection.

8. The control system of claim 1, wherein the controller further comprises a memory, and the controller is arranged to store the indicator signal in the memory.

9. The control system of claim 1, wherein:

the valve is a mixer valve, wherein the one or more supply inlets include a first inlet and a second inlet configured to receive a supply of hot and cold water such that one of the first and second inlets carries a supply of hot water and the other of the first and second inlets carries a supply of cold water, the one or more valve members include a first valve member arranged to control the flow of water from the first inlet and a second valve member to control the flow of water from the second inlet, and the output is configured to output cold water, hot water or a mixture thereof as the output stream; and the one or more temperature sensors comprise any one or more of: a) a first temperature sensor arranged to generate a temperature signal indicative of the temperature of hot or cold water upstream of a respective valve member; b) a second temperature sensor arranged to generate a temperature signal indicative of the temperature of the other of the hot or cold water upstream of a respective valve member; and/or c) an output temperature sensor arranged to generate a temperature signal indicative of the temperature of the output water downstream of the one or more valve members.

10. The control system of claim 1, wherein the control system comprises a plurality of outputs, each configured to output water from the one or more inlets, the plurality of outputs being configured to supply multiple water outlets of the same ablutionary device and/or a plurality of ablutionary devices, and the control system further comprises one or more shut-off valves each arranged to control the flow in each of the outputs, and wherein the one or more shut-off valves are activated in response to the indicator signals.

11. A method performed by a control system for one or more ablutionary devices, the control system comprising a valve having one or more valve members each arranged to receive a respective water supply via one or more supply inlets, and an output for supplying output water to the one or more ablutionary devices downstream of the valve, the one or more valve members being arranged to control the flow of water between the one or more supply inlets and the output, the method comprising:

obtaining one or more temperature signals when the one or more ablutionary devices are not in use, the one or more temperature signals being indicative of the temperature of any one or more of: the water supply upstream of any one or more of the valve members, and the output water down stream of the one or more valve members;

generating an indicator signal based on a comparison of the one or more temperature signals to one or more thresholds, the one or more thresholds including at least a low temperature expansion warning threshold and a high temperature expansion warning threshold; and activating the valve and allowing water to flow from the output to alleviate pressure build up in response to each of:

an indicator signal based on a temperature signal from the water supply upstream of at least one valve member being below the low temperature expansion warning threshold; and an indicator signal based on a temperature signal from the water supply upstream of at least one valve member being above the high temperature expansion warning threshold.

12. The method of claim 11, wherein the indicator signal is generated if the comparison of the one or more temperature signals to the threshold indicates that the water is at a temperature corresponding to water expansion greater than a tolerance of the control system.

13. The method of claim 11, wherein the one or more thresholds include a high temperature operation damage warning threshold and the indicator signal is generated if the comparison indicates that the water temperature is greater than the high temperature operation damage warning threshold, the high temperature operation damage warning threshold corresponding to a maximum safe operating ambient temperature of the control system, and the method further comprises blocking operation of the one or more ablutionary devices, or limiting an operating duration of the one or more ablutionary devices, in response to the generation of the indicator signal based on the high temperature operation damage warning threshold being exceeded.

14. The method of claim 11, wherein the one or more temperature signals are obtained from the one or more temperature sensors after a time period of non-use has elapsed.

15. The method of claim 11, wherein the one or more thresholds include a predefined low temperature alert threshold, wherein the indicator signal is generated if the comparison indicates that the water temperature is less than the predefined low temperature alert threshold at any point during non-operation of the ablutionary device.

16. The method of claim 11, further comprising sending the indicator signal to a user interface and/or a remote device for display and/or storage, and wherein sending the indicator signal is done via a wireless connection or via a wired connection.

17. The method of claim 11, further comprising storing the indicator in a memory of the control system.

18. The method of claim 11, wherein:
the valve is a mixer valve, wherein the one or more supply inlets include a first inlet and a second inlet configured to receive a supply of hot and cold water whereby one of the first and second inlets carry a supply of hot water and the other of the first and second inlets carry a supply of cold water, the one or more valve members include a first valve member arranged to control the flow of water from the first inlet and a second valve member to control the flow of water from the second inlet, and the output is configured to output cold water, hot water or a mixture thereof as the output stream; and
the one or more temperature signals include any one or more of: a) a temperature signal indicative of the temperature of hot or cold water upstream of the respective valve member; b) a temperature signal indicative of the temperature of the other of the hot or cold water upstream of a respective valve member; and/or c) a temperature signal indicative of the temperature of the output water down stream of the one or more valve members.

19. The method of claim 18, wherein the control system comprises a plurality of outputs, each configured to output water from the one or more inlets, the plurality of outputs being configured to supply multiple water outlets of the same ablutionary device and/or a plurality of ablutionary devices, and wherein the control system further comprises one or more shut-off valves each arranged to control the flow in each of the output conduits, and the method further comprises activating one or more of the shut-off valves in response to the indicator signal.

* * * * *